United States Patent [19]

Bonko et al.

[11] Patent Number: 5,016,696
[45] Date of Patent: May 21, 1991

[54] SELF-CLEANING TIRE TREAD

[75] Inventors: Mark L. Bonko, Hartville; Loran C. Lopp, Jr., Wadsworth, both of Ohio

[73] Assignee: The Goodyear Tire & Rubber Company, Akron, Ohio

[21] Appl. No.: 419,879

[22] Filed: Oct. 11, 1989

[51] Int. Cl.$^5$ ............................................. B60C 11/08
[52] U.S. Cl. ............................ 152/209 B; 152/209 R
[58] Field of Search ...................... 152/209 R, 209 B; D12/140, 146, 147, 149, 151

[56] References Cited

U.S. PATENT DOCUMENTS

| | | | |
|---|---|---|---|
| D. 169,668 | 5/1953 | Hardeman | D12/151 |
| D. 255,674 | 7/1980 | Menin | D12/147 |
| D. 256,008 | 7/1980 | Menin | D12/147 |
| D. 293,093 | 12/1987 | Nishio et al. | D12/147 |
| 1,211,958 | 1/1917 | Overman | 152/209 R |
| 2,756,798 | 7/1956 | Palko et al. | 152/209 R |
| 3,030,998 | 4/1962 | Jensen | 152/209 |
| 3,603,370 | 9/1971 | Hylbert | |
| 4,383,567 | 5/1983 | Crum et al. | 152/209 B |

FOREIGN PATENT DOCUMENTS 58-152604  9/1983  Japan .............................. 152/209 B
2021049  11/1979  United Kingdom .

OTHER PUBLICATIONS

1985 Tread Design Guide, p. 221, 2nd row from top, "Kleber Super 50 S" & Super 100 S Firestone Radial 7000.

Primary Examiner—Michael W. Ball
Assistant Examiner—Mark A. Osele
Attorney, Agent, or Firm—David L. King; R. J. Slattery, III

[57] ABSTRACT

A tread element (314) is located between the axially outer end of the lugs of the tread and lateral tread edge (310) of the tire (300). The tread elements (314) provide a flexing action for breaking the soil bond or adhesion to the tread of the tire. The tread elements (314) are not located in the discharge path but are adjacent to the discharge area in order to eject or remove soil, mud, sand etc., therefrom.

12 Claims, 9 Drawing Sheets

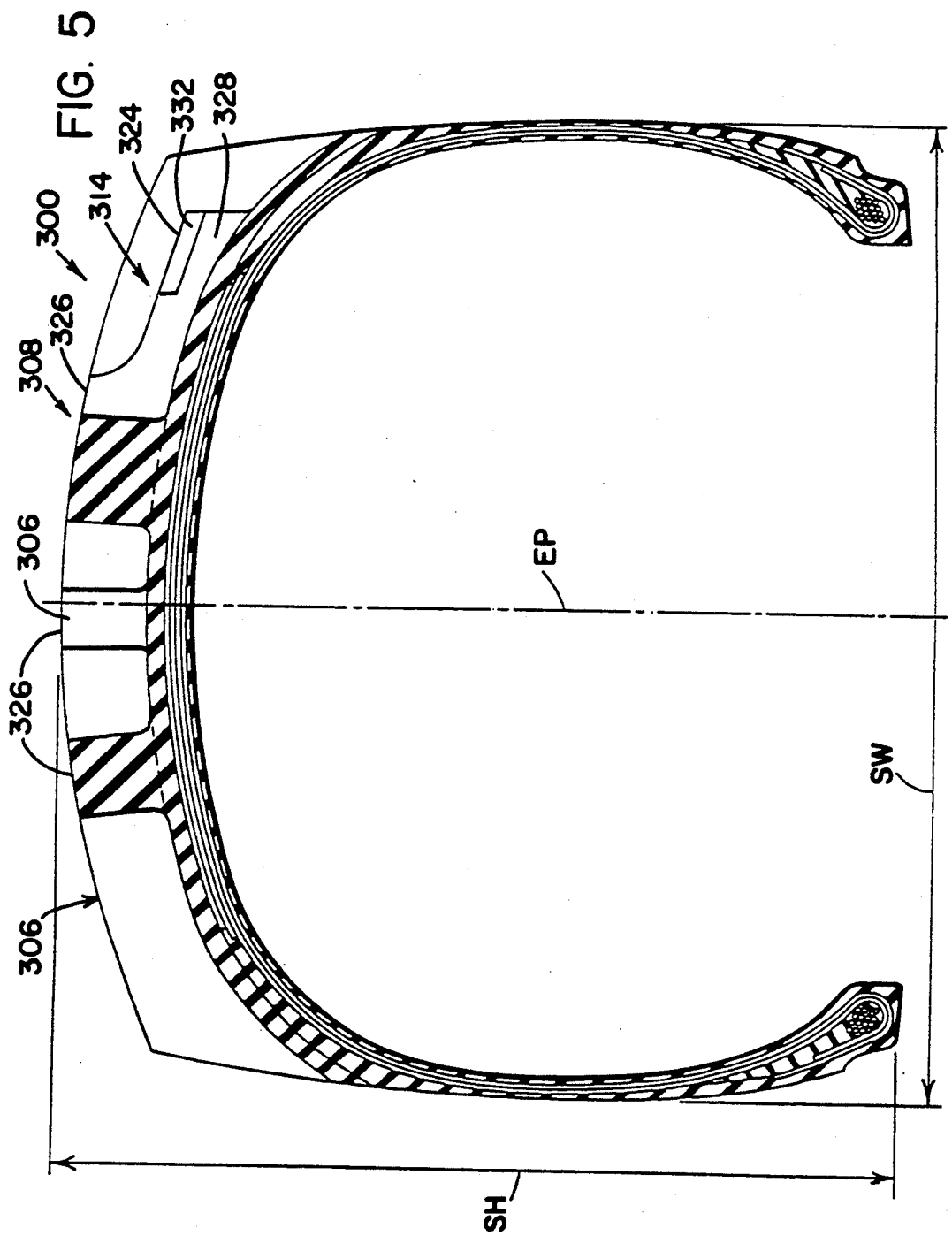

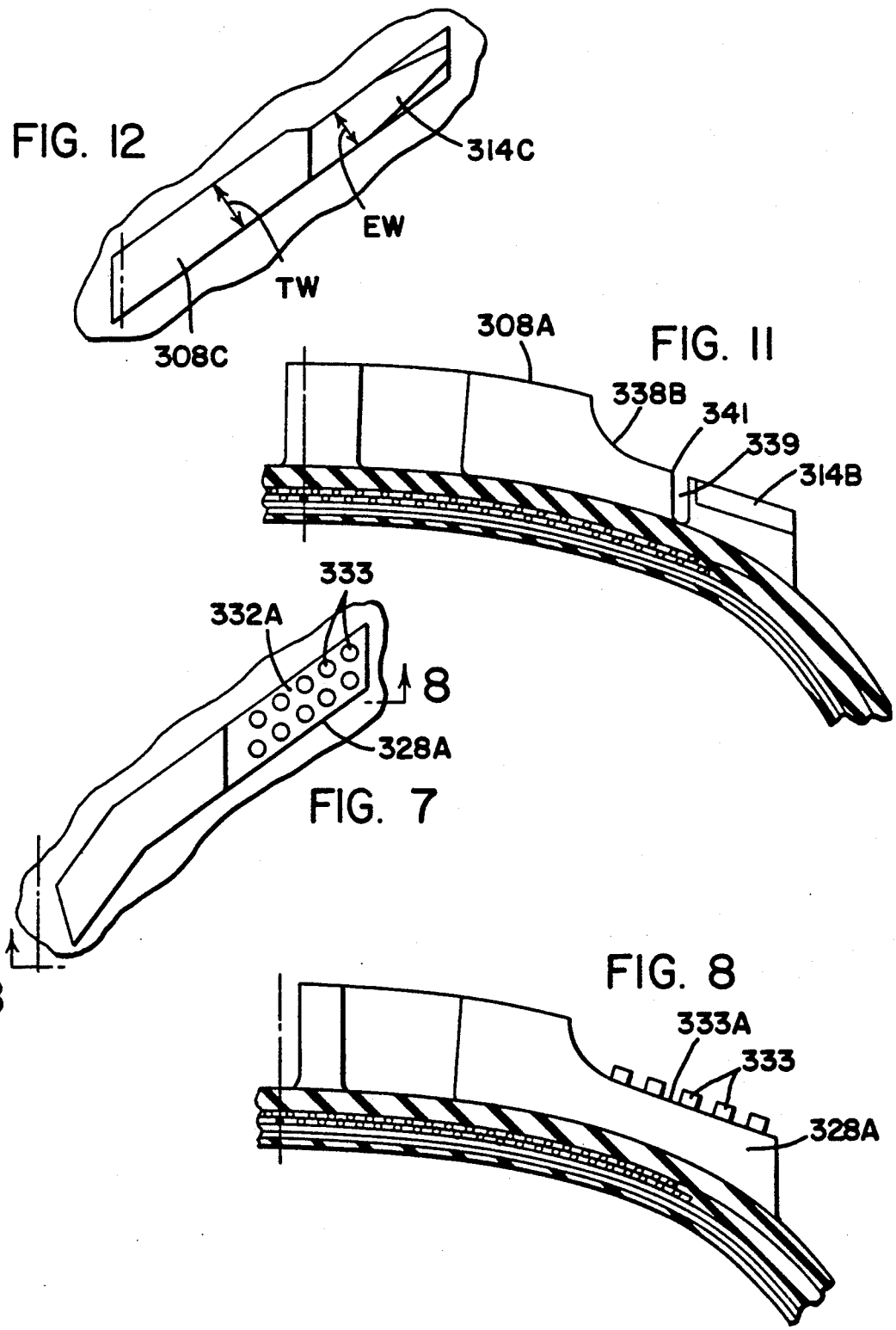

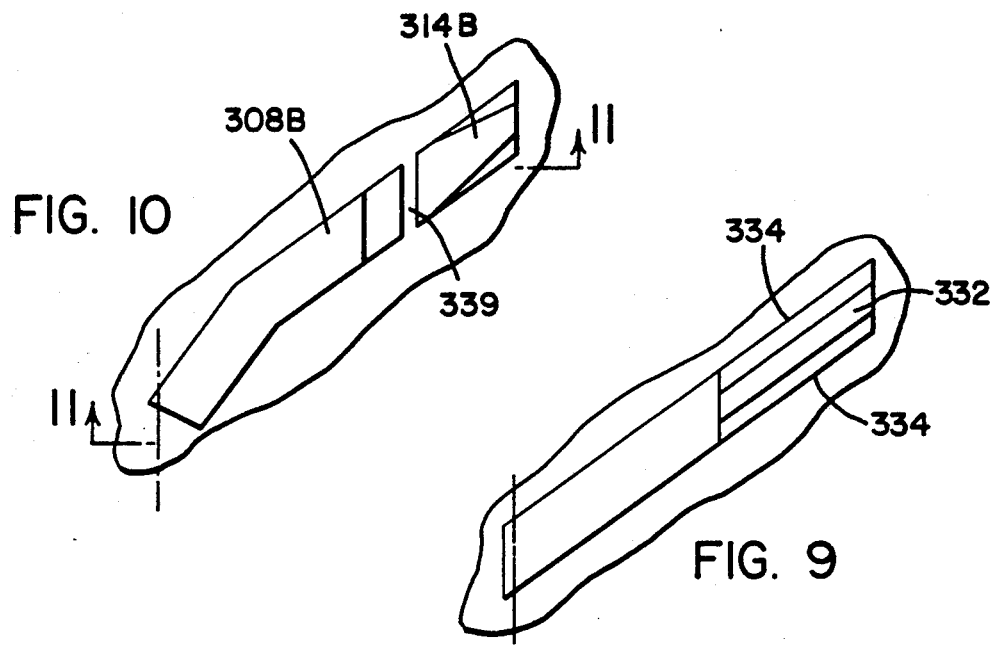
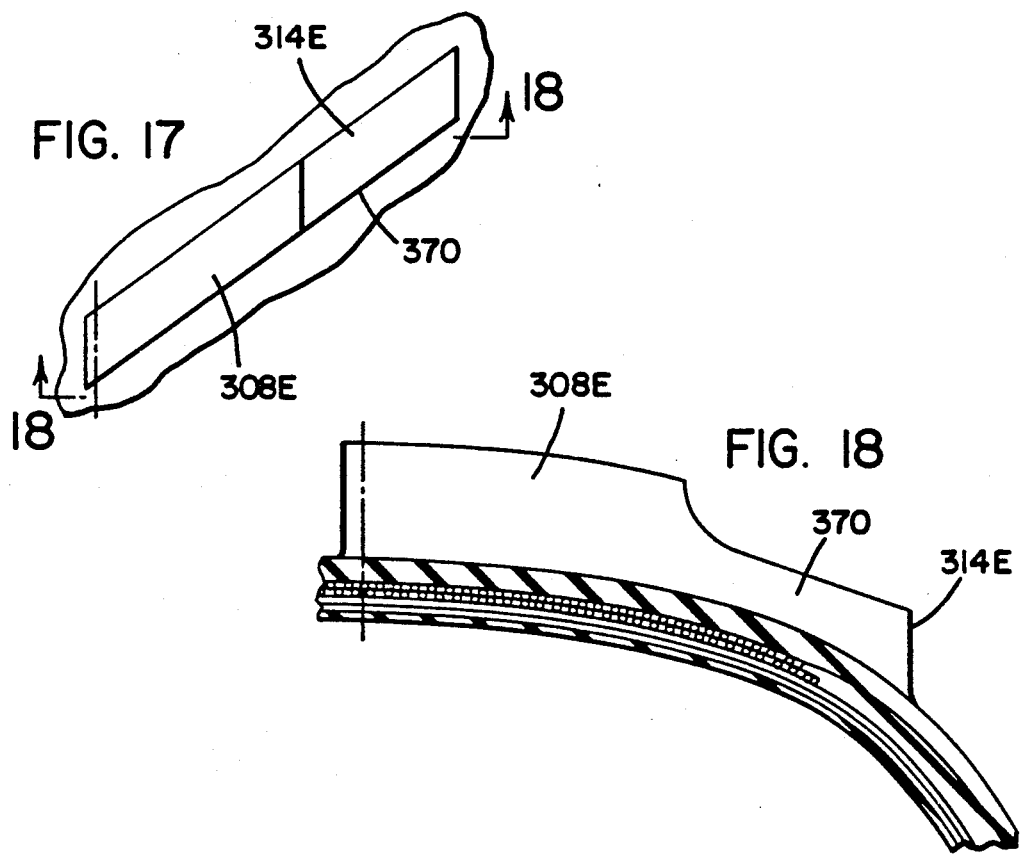

SELF-CLEANING TIRE TREAD

BACKGROUND OF THE INVENTION

The present invention relates generally to pneumatic tires and more specifically to pneumatic tires designed to be used primarily off-the-road, and even more specifically as agricultural (farm) tires or tractor tires. Still more specifically the invention relates a tread having good soil cleaning characteristics especially in the removal of mud.

Pneumatic tires designed primarily for off-the road use often feature an "open" tread pattern with a lower net-to-gross ratio than tires intended for highway use. For example the net-to-gross ratio of off-the-road or agricultural tires can range from 25% to 40% as compared to about 60–75% for on the road tires.

Off-the-road or agricultural tires also commonly feature axially extending tread lugs which cut into the loose ground surface and an inner tread surface, the area between the protruding tread lugs, which usually contacts the ground surface. In normal operation, the lugs cut into the loose ground surface and provide a means for axial traction and lateral stability while the inner tread surface provides flotation and supports the weight of the vehicle. In a tire designed for a more conventional highway application, the area of the inner tread surface between the protruding tread lugs is not meant to contact the road surface.

In that these tires are capable of being used on a variety of surfaces, such as mud, sand, compacted soil, gravel, etc. the foreign matter or soil must be "cleaned", removed, from between the lugs, otherwise the axial traction and lateral stability will be reduced. In other words, if the grooves, the area between the lugs, becomes compacted or filled during a rotation of the tire by soil and it is not removed during the next rotation, the traction for subsequent tire rotations will be reduced. This may then result in the tractor or vehicle becoming immobile.

In order to enhance the cleaning or removal of soil or other debris from the tread, attempts have been made to place cleaning elements between the lugs, such as U.S. Pat. No. 3,030,998 to Jensen. The cleaning elements extend along the axial or lateral extent of the lugs and appear to be as tall as the lugs themselves. It is believed that this attempt to solve the problem of cleaning focuses on the wrong area of the tread. Rather, it is believed that the area between the lugs should remain as free and clear of obstruction as possible while placing the cleaning element at the discharge area of the tire, ie the lateral edges of the tread. In other words, if the area adjacent to the lateral edges of the tread remain open, the soil will be able to be discharged from between the lugs as it is channeled therefrom. The placing of objects, or ribs, such as taught in U.S. Pat. No. 3,030,998 is believed to hinder the natural flow or discharge of the soil.

SUMMARY OF THE INVENTION

It therefore is an object of this invention to provide an improved tread for use with agricultural or off-the-road tires.

It is also an object of this invention to provide a means for dislodging foreign material, such as mud, sand, etc from the tread to enhance tread cleaning.

It is an object of this invention to provide a tire tread which will help a tractor to reach stable ground once loose or unstable soil conditions have been encountered, such as mud.

It is a feature of the invention to provide tread irregularities between a lug and the lateral edge of the tread for breaking the soil bond with the tire and thereby keeping the discharge area open.

It is also a feature of the invention to provide flexible tread elements for removing or cleaning the soil from the tire.

It is also a feature of the invention according to one embodiment to provide a tread element having a two-tiered raised platform configuration.

It is still further a feature of the invention according to one embodiment to provide a tread element having a raised rectangular platform or base with a second rectangular step thereon.

It is an advantage of the invention that tractors or the like when encountering mud will be able to remove their vehicles to drier land better than in the past.

These and other objects, features and advantages can be accomplished by an off-the-road or agricultural tread having a plurality of circumferentially-spaced tread lugs projecting radially outward from an inner tread surface and extending generally axially: and a means located axially outwardly from a plurality of said lugs, generally axially extending, and projecting radially outward from the inner tread surface, for removing foreign matter from between circumferentially adjacent lugs and wherein the radial outward projection is less than 35% of the radial outward projection of the lugs.

These and other objects, features and advantages can be still further accomplished by a tire tread having; a plurality of circumferentially-spaced tread lugs, each lug projecting radially outwardly from an inner tread surface to an outer road contacting tread surface; and wherein at least some of the lugs have a tread element, disposed axially between the lug and the lateral edge of the tread, each element projecting radially outwardly from the inner tread surface to a radially outer surface which is less than the road contacting surface of the lug: and wherein said tread elements are adapted for movement from a first position to a second position when said tread is rotated through a footprint of the tire.

These and other objects, features and advantages can be still further accomplished by a method of cleaning soil from a tread of a tire during operation thereof comprising the steps of:

cutting and shearing the soil by a plurality of circumferentially spaced and axially extending lugs to provide axial traction and lateral stability:

channeling the soil from an axially inner point along a discharge path to a discharge area located axially adjacent to the tread edge:

breaking a bond between the soil and the tread by providing a flexing or twisting action in the discharge area, between a lug and the tread edge, as the tire rotates through and out of a footprint, and which is different from the flexing or twisting of the lugs of the tread

BRIEF DESCRIPTION OF THE DRAWINGS

The following is a brief description of the drawings in which like parts may bear like reference numerals and in which:

FIG. 5 is a fragmentary view of a cross-section of the tire according to FIG. 4 taken along line 5—5:

FIGS. 7-10 are alternate embodiments of a lug and a tread element:

FIG. 11 is an elevational view of the lug and the tread element of FIG. 10 taken along line 11—11:

FIGS. 12 and 13 are alternate embodiments of a lug and tread element:

FIG. 17 is an alternate embodiment of a lug and a tread element; and

FIG. 18 is an elevational view of the lug and tread element of FIG. 17 taken along line 18—18.

DETAILED DESCRIPTION OF THE INVENTION

The invention also may be better understood in the context of the following definitions, which are applicable to both the specification and to the amended claims:

"Axial" and "axially" are used herein to refer to lines or directions that are parallel to the axis or rotation of the tire.

"Leading" refers to a portion or part of the tread that contacts the ground first, with respect to a series of such parts or portions during rotation of the tire in the preferred direction.

"Inner tread surface" means that part of the tread between the protruding tread lugs.

"Net-to-gross ratio" means the ratio of the area of the tire tread which normally makes contact with a paved road surface while in the footprint, divided by the area of the tread in the footprint, including non-contacting portions such as the inner tread surface. "Outer tread surface" or "ground penetrating surface" means the radially outermost surface of the protruding tread lugs. "Radial" and "radially" are used to mean directions radially toward or away from the axis or rotation of the tire. "Trailing" refers to a portion or part of the tread that contacts the ground last, with respect to a series of such parts or portions during rotation of the tire in the preferred direction.

Figure 1:
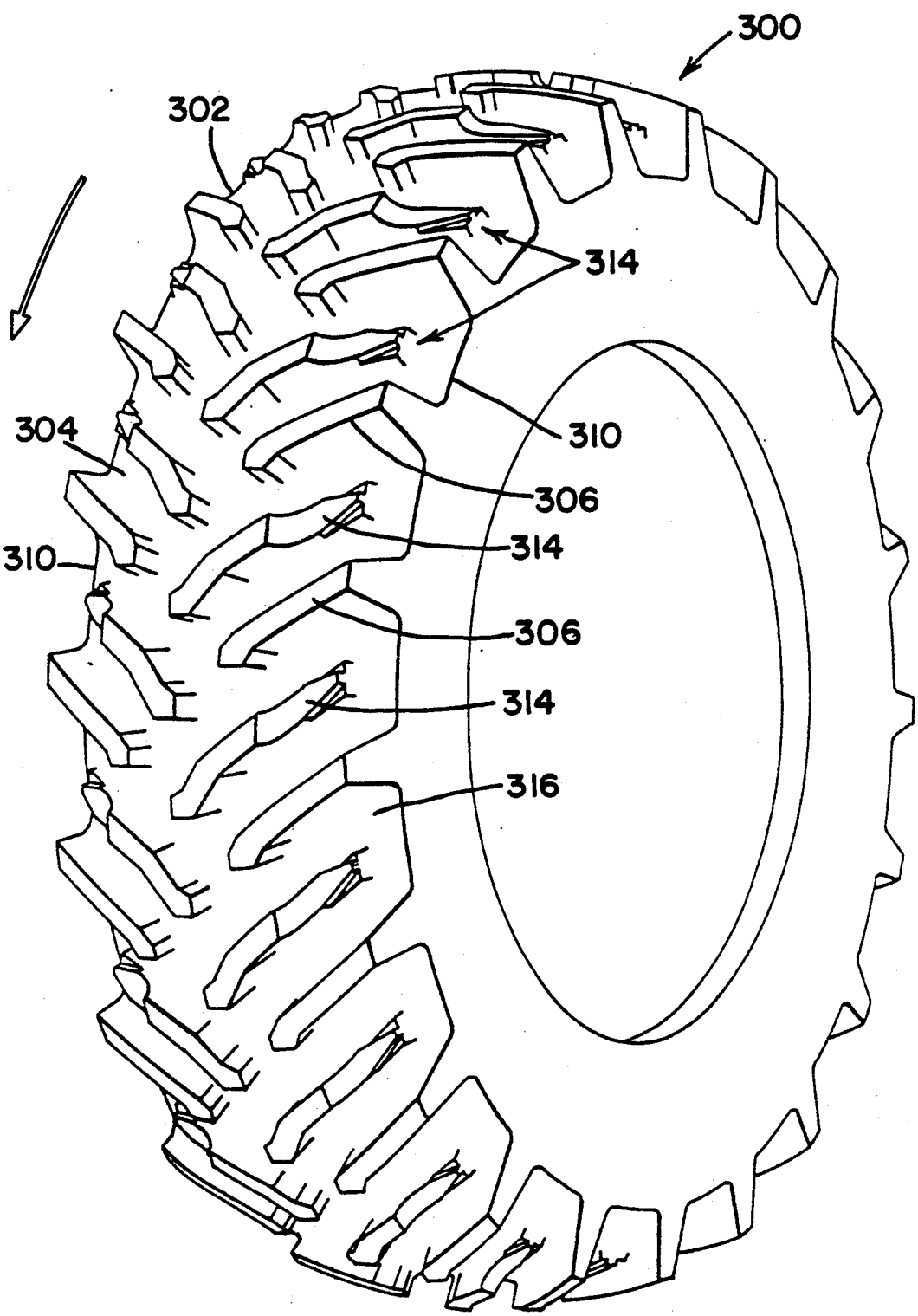
FIG. 1 is a perspective elevational view of a pneumatic tire incorporating the tread elements integrally with the tread lugs according to one embodiment of the invention.
Figure 2:
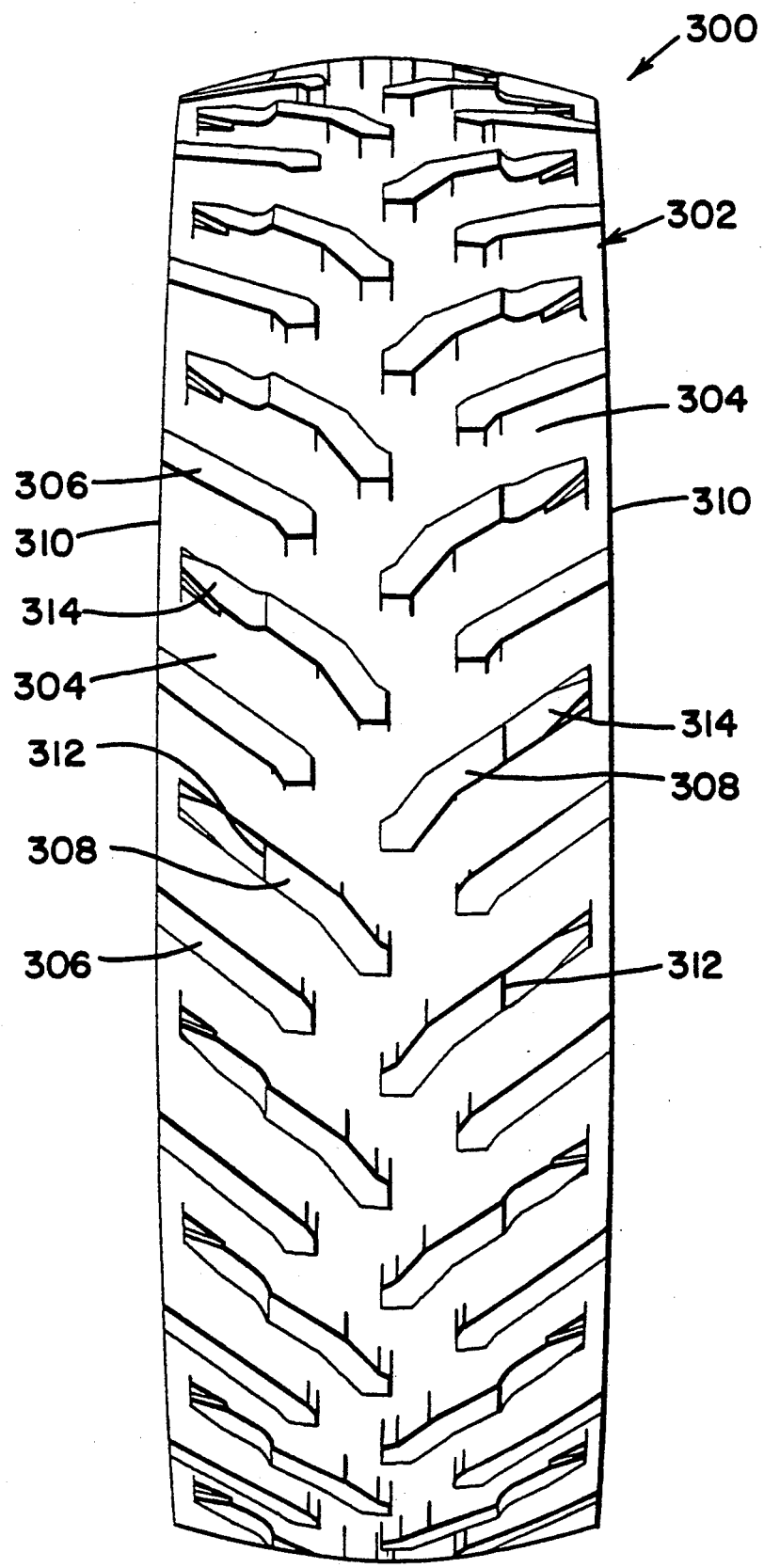
FIG. 2 is a front elevational view of the tire of FIG. 1.
Figure 3:
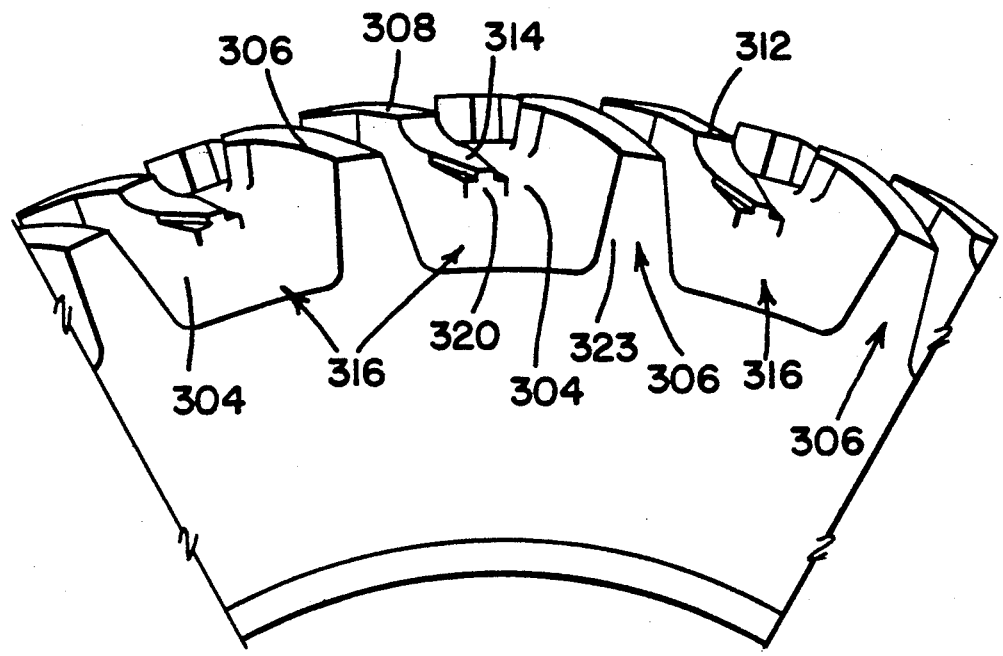
FIG. 3 is a partial side view of the tread of FIGS. 1 and 2.

With particular reference now to FIGS. 1, 2, and 3 there is illustrated, for example, a pneumatic tire 300 designed primarily for off-road-use. The tire 300 may have a directional tread 302 with the preferred direction indicated by the arrow. From the inner tread surface 304, which has curvature in both the axial and circumferential directions, protrude axially extending primary lugs 306 and secondary lugs 308. The primary lugs 306 extend from an axial or lateral tread edge 310 of the tire while the secondary lugs extend from an axially outer end 312 which is located an axial distance from the tread edge 310. The tread of the tire is further provided with tread elements 314 integral with and extending from a secondary lug 308 axially outwardly towards the respective lateral tread edge 310. The tire 300 of FIGS. 1, 2, and 3 is further described in copending U.S. Application Ser. No. 07/419,912 filed concurrently herewith by M. L. Bonko, the disclosure of which is hereby incorporated by reference.

While the tread element 314 is preferred to be used with the tire and/or tread of FIG. 1 and those others described in U.S. Application Ser. No. 07/419,912 it is not meant to be limited thereto.

Figure 4:
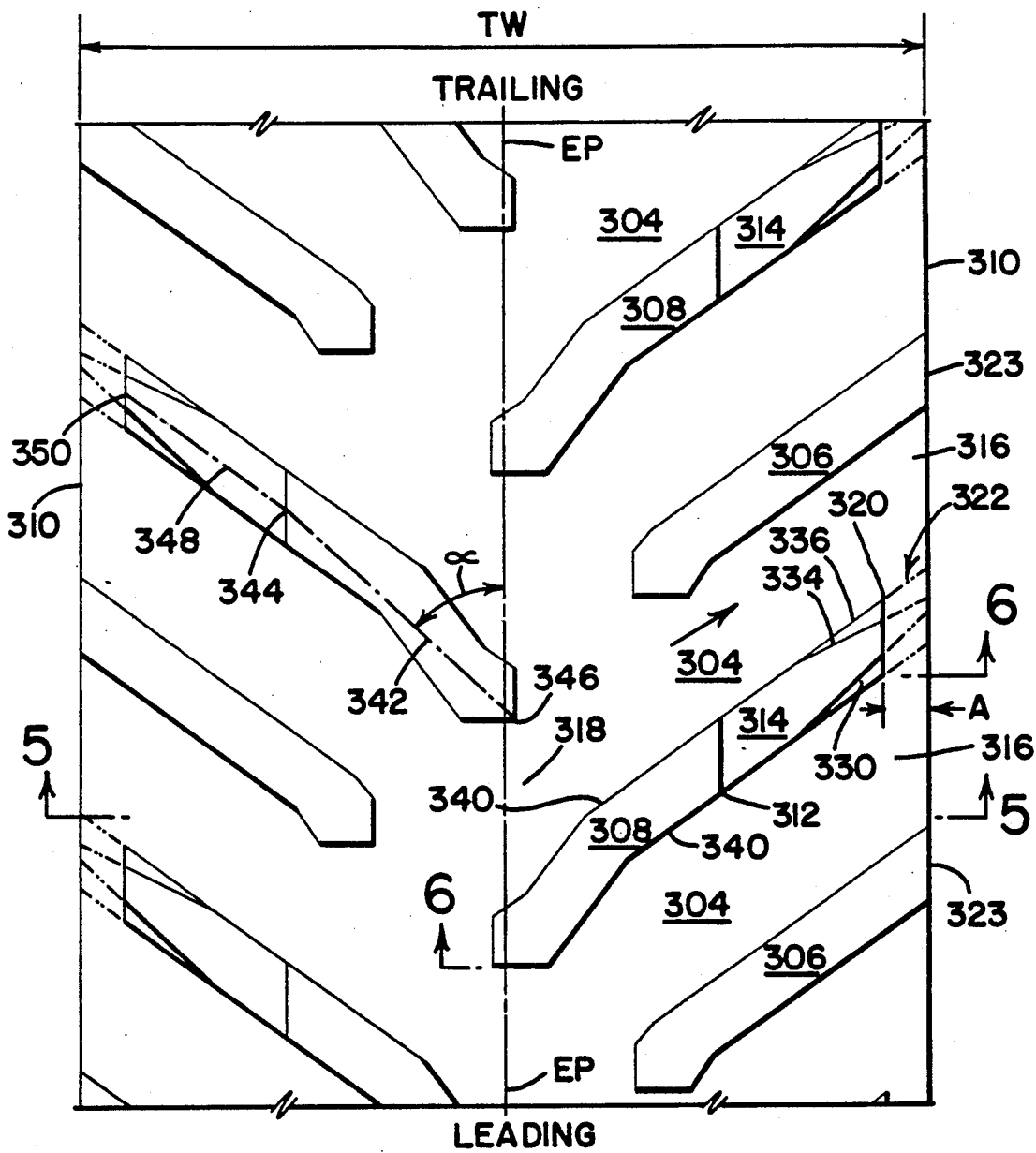
FIG. 4 is an enlarged fragmentary view of the tread of FIGS. 1 and 2.

Referring also with and more particularly to FIG. 4, each tread element 314 is located in the area of the tread that acts as a soil discharge area 316. As the primary and secondary lugs 306, 308 cut into the ground surface the loose soil is pushed axially outwardly past the inner tread surface 304 and discharged out at the tread edge or discharge area 316. The tread elements 314 may be located in a generally axial alignment with the secondary lugs 308 such that the discharge path, indicated by the arrow from the axially inner or central portion 318 of the tread to the discharge area 316 is free of obstructions. In this manner the free flow of soil and other debris is uninterrupted.

The axially outer portion 320 of the tread element 314 is preferably spaced a distance "A" from the lateral edge 310 of the tread, although it may extend to the lateral edge 310 of the tread and is shown in phantom at 322. It is believed that spacing the tread element from the lateral edge allows the outer portion 320 to twist differently than the axially outermost portion 323 of the adjacent lugs 306 when passing through the footprint of the tire during off the road operation. The establishment of a different twisting or movement of the tread element and the associated adjacent lugs is believed to contribute to the breaking up of the bond or adhesion between the soil and the surface of the tread. It therefore is preferred that the distance "A" be from 0% to about 10% of the tread width TW of the tread with the more preferred distance being about 5%.

Figure 6:
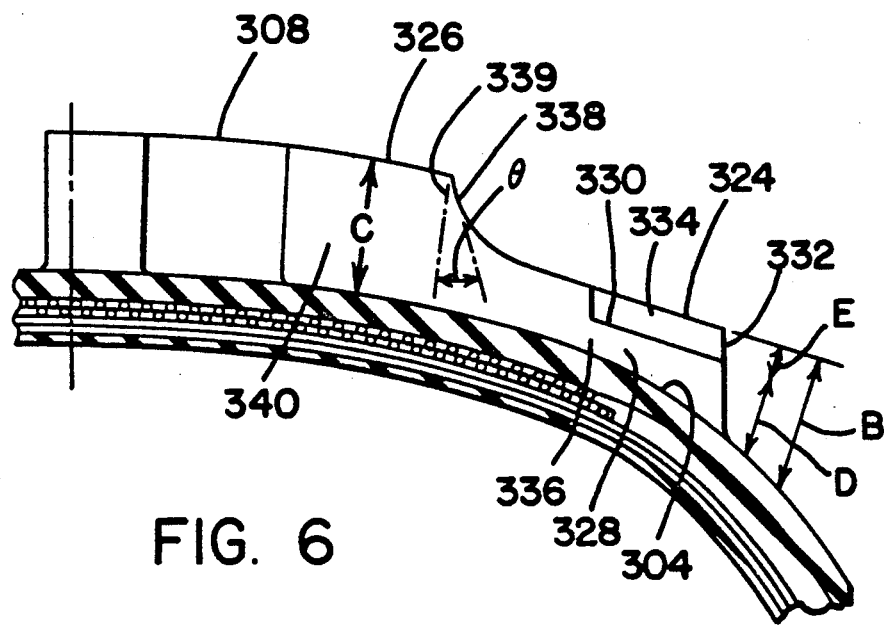
FIG. 6 is an enlarged elevational view of a tread element according to one embodiment, FIG. 4 of the invention taken along line 6—6.

Referring specifically to FIGS. 4, 5 and 6 the tread element projects radially outwardly a distance "B" from the inner tread surface 304 to a radially outer surface 324 which is a non-road contacting surface. Often a tire designed primarily for off-road use or agricultural use must be driven on paved road surfaces. In such cases, only the radially outer tread surface 326 of the lugs 306, 308 contacts the road surface. Therefore, these lugs must have sufficient width and strength to support the vehicle. However the radial outer surface 324 of the tread element 314 is not intended to contact the road surface in such instances and therefore the height B is less than the radially outward projection of the lugs "C". The distance "C" being the same as the non-skid depth of the tire, and is measured as is commonly known in the art.

The lugs of off-the-road tires, being the means for providing axial traction, are subject to shearing and torsional forces in both off-the-road and on-the-road road conditions. As such, the lugs must be braced to withstand such forces, because too much flexing or twisting is undesirable. The tread elements, 314 unlike the lugs, are designed to be flexible and bend back and forth. The tread elements are not intended to provide axial traction, but rather they are intended to provide a flexing action, much like a wiper blade, to keep the discharge area clean.

Therefore, the height of the tread element must not become too high or it will act more and more like a lug, thereby reducing its different twisting relative to adjacent lugs. It is therefore believed that the radial height "B" of the tread element should be less than 35% of the distance "C". On the other hand, if the height of the tread element becomes too small it may also reduce its flexibility. It is therefore preferred that the radial height "B" of the tread element be within the range of about 10% to 35% of the distance "C", with the most preferred, being from about 15% to about 25%. It is believed that the difference in height between the tread element and the lug introduces an irregularity into the tread surface which further helps break the soil bond.

In the preferred embodiment the tread element is stepped or tiered having a first or base portion 328 projecting radially outwardly from the inner tread surface 304 to a radially outer surface 330 forming a type of platform. A second portion 332 extends from the platform 330 to the radially outer surface 324. The radially outer surface 324 of the second portion 332 being a non-road contacting surface should not be evident in a footprint of the tire. While it is preferred that the height of the base portion "D" and that of the second portion "E" are equal to one another, it is envisioned that they could be different.

It is also preferred that the base portion 328 and the second portion 330 are different from one another. For example the base portion 328 could be a raised rectangle (cubic rectangular) while the second portion 332 could be a raised triangle or other geometric or polygonal shape. Alternatively the second portion 332A may be provided with dimples, or projections 333, FIGS. 7 and 8 which extend from the first portion 328.

It is preferred that the tread element develop different torques across circumferentially its axial extent as it passes through the footprint of a tire during a rotation. This can be accomplished by the second portion 332 having at least two different twisting edges produced from the axially extending side walls. For example, referring again to FIGS. 4, 5, and 6 it is preferred that at least a portion of the axial sidewalls be not parallel to one another. In other words the sidewalls 334 of the second portion may taper in towards each other axially outwardly from the secondary lug 308. The sidewalls 336 of the base portion 328 on the other hand are preferred to be parallel to one another. In that the base portion is of one configuration and the second or outer portion is of a different configuration each portion will react differently to the torsional forces applied to it. It is therefore preferred that the sidewalls 334 of the second portion 308 are not parallel with the side walls of the first. It is envisioned however that the sidewalls 334 of the second portion 332 may be parallel to one another, for example as illustrated in FIG. 9 and that this combination may work satisfactorily.

Again referring to FIGS. 5 and 6, the transition from the lug 308 to the tread element 314 is provided by an inclined portion 338. This inclination, illustrated here as a curve, although it could be substantially straight, acts not only as a means for blending the lug to the tread element but also provides a means for bracing or reinforcing the lug 308.

The inclination $\theta$ of the inclined portion is preferably in the range of 25° to 30° with respect to a radial line 339. In practice the non-skid depth "C" and the axially outermost end of the lug is established. The tread element's axially outermost end and its associated height is then established. The inclined portion may then be determined to provide the bracing to and the transition from the lug.

Although the tread element 314 has been shown to be integral with the lug 308, it could be axially spaced therefrom. For example, referring to FIGS. 10 and 11, the tread element 314B is spaced a predetermined axial distance from the secondary lug 308B which forms a groove 339. The secondary lug 308B is braced or reinforced by the inclined portion 338B which terminates at a radially outer end 341 which has a height which is substantially the same as that of the tread element 314B.

The maximum width "EW" of the tread element 314C is preferably no wider than that of the associated secondary lug 308C width "TW", although it could be smaller, refer to FIG. 12. The reason that the tread element should not be wider is that this would tend to reduce the discharge area and may therefore restrict the flow of material.

The tread element 314 may be an axial projection of the lug 308 such that the sidewalls of each are in alignment in the axial direction. For example, referring to FIGS. 4 and 6 again, the sidewalls 336 of the base portion 328 may be generally axially aligned with the sidewalls 340 of the lug. Alternatively the tread element can have an angular inclination that is different from the general inclination of the lug. The general angular inclination of the lug is determined by establishing a line 342 connecting the midpoint 344 of the length of the axially outermost edge of the lug with the axially innermost point of the leading edge of the lug 346 and the acute $\alpha$ angle this line makes with the equatorial plane EP. The angular inclination of the tread element is established by the line 348 passing through the midpoint 350 of the length of the axially outermost edge of the lug and the midpoint 344 of the length of the axially outermost edge of the midpoint of the tread element. The acute angle that line 348 makes with respect to the equatorial plane EP or a line parallel thereto is then the angular inclination of the tread element.

Figure 13:
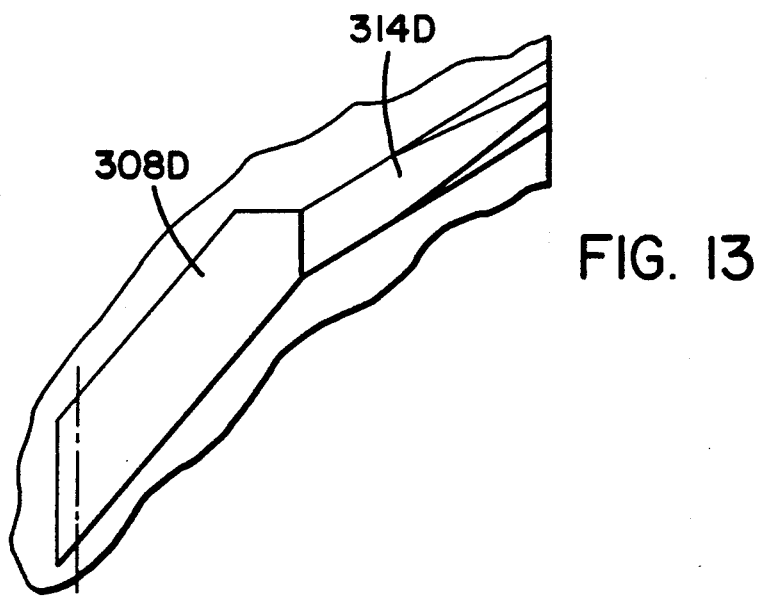

Referring to FIG. 13 there is illustrated an example of a portion of a tread wherein the tread element 314D is not in alignment with, and has a different general angular inclination with, the associated secondary lug 308D.

Figure 14:
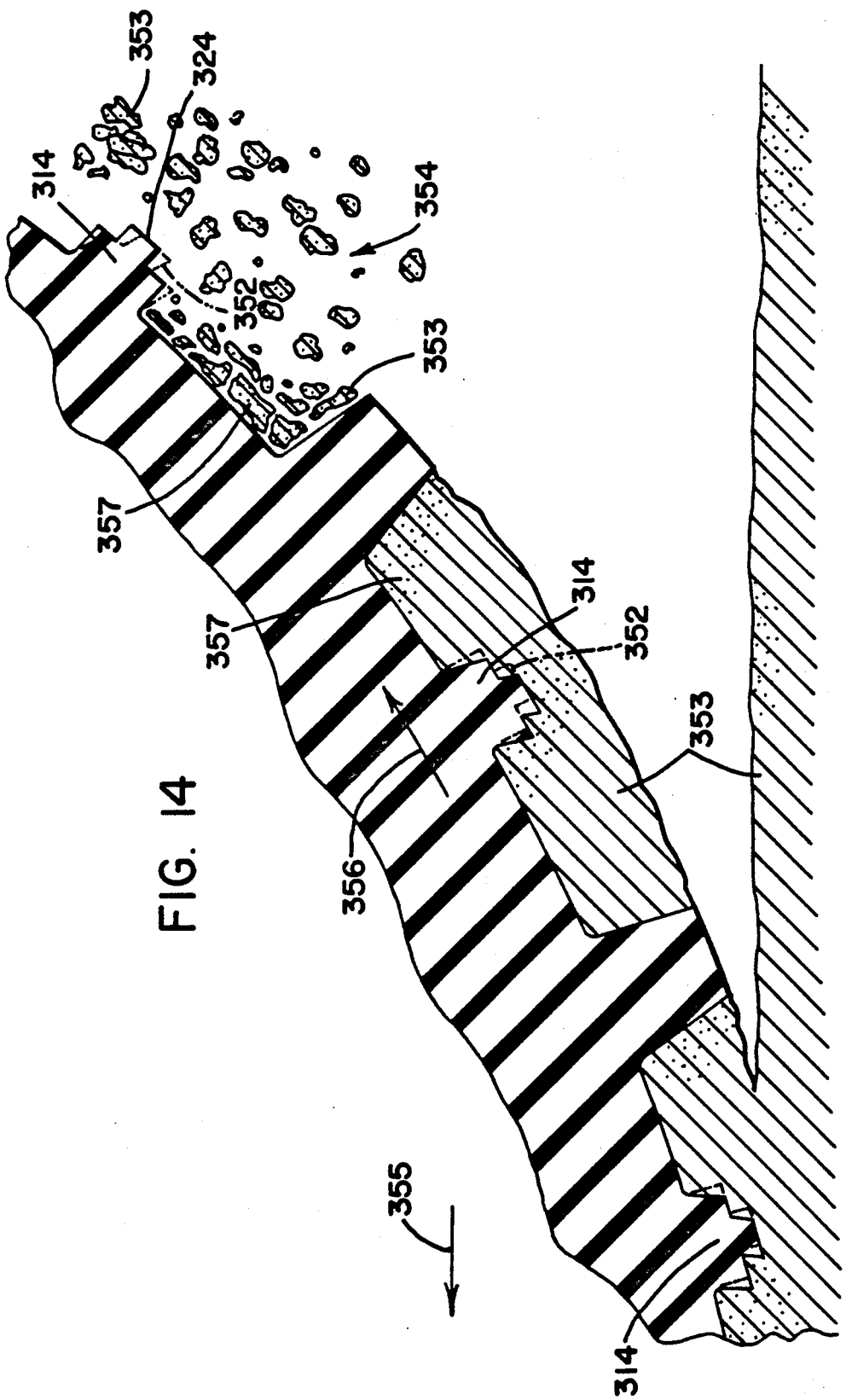
FIG. 14 is a partial side view of a tire according to one embodiment during the operation of the tread element.

Referring now to FIG. 14, the development of different torques across the tread elements 314 allows for the twisting and flexing of the element and the wiper movement, back and forth indicated in phantom 352 that increases the efficiency of the device in breaking the soil 353 loose and allowing for the discharge thereof during rotation. The direction of travel of the vehicle is indicated by arrow 355 while the rotation of the tire is indicated by arrow 356. Not all of the soil may be removed however. Soil should be discharged radially outwardly of the outer surface 324 of the tread element. Soil compacted radially inwardly 357 of the second portion of the tread element may or may not be discharged due to the fact that it is below (radially inwardly) the greatest effect of the twisting and flexing associated with the tread element. Even if this area remains compacted though the tire should still be provided with enough mobility for the tractor to again reach more stable ground.

Figure 15:
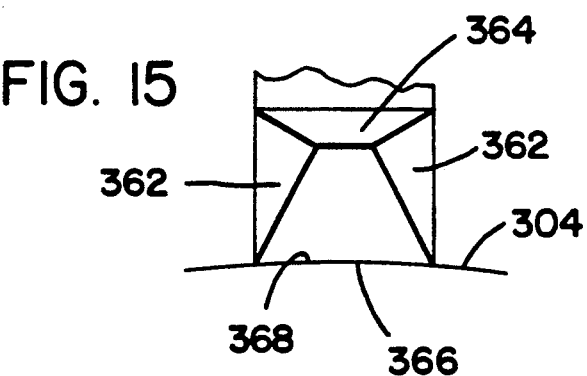
FIG. 15 is an alternate embodiment of a lug and tread element.
Figure 16:
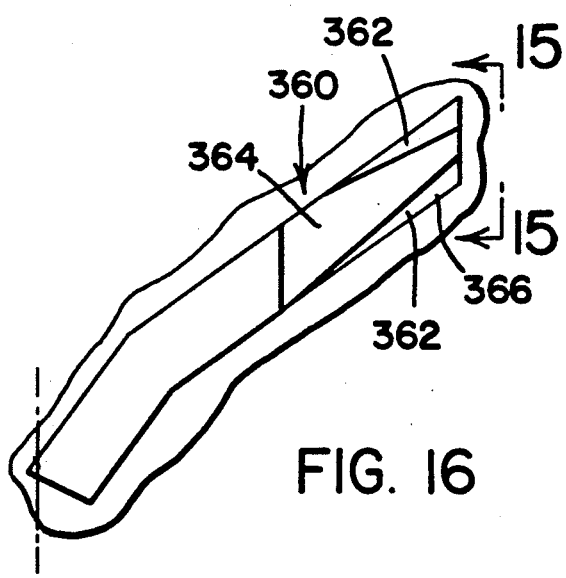
FIG. 16 is a side view of the tread element of Figure taken along line 16—16.

Referring now to FIGS. 15 and 16, it is believed that the tread element 360 may in the alternative be one portion instead of two different portions. The axial sidewalls 362, for example may extend radially outwardly from the inner tread portion 304 at an angle that is not perpendicular. In other words, the radially outermost portion 364 is smaller than the radially inner most portion 366 of the tread element. For example in cross-section the tread element may be a trapezoid. The base 368 of the trapezoid being adjacent to the inner tread surface 304. The radially outer most surface may further taper radially inwardly, axially outwardly from the lug such that the smallest trapezoid in cross-section is located the most axially outwardly.

Referring now to FIGS. 17 and 18 it is also envisioned that the tread element 314E may comprise one portion in which the axial sidewalls 370 do not taper. In other words the tread element 314E may have a substantially rectangular cross-section. The axial sidewalls could then be an axial extension of the associated lug 308E.

Furthermore, although every other lug circumferentially around the tire has been shown having an associated tread element this could be changed such that more or less lugs are so equipped.

While certain representative embodiments and details have been shown for the purpose of illustrating the invention, it will be apparent to those skilled in this art that various changes and modifications may be made therein without departing from the scope of the invention.

It is claimed:

1. An agricultural tread, having an equatorial plane and a net-to-gross ratio in the range of 25% to 40%, the tread comprising:
    an inner tread surface;
    a first and a second lateral edge;
    two sets of circumferentially spaced primary lugs extending radially outwardly from the inner tread surface to a ground contacting surface, the first set of primary lugs extending generally axially inwardly from the first lateral edge, the second set of primary lugs extending generally axially inwardly from the second lateral edge;
    two sets of circumferentially spaced secondary lugs extending radially outwardly from the inner tread surface to a ground contacting surface, the lugs of the first set of secondary lugs extending generally axially inwardly from an axial outermost end spaced axially inwardly of the first lateral edge, the lugs of the first set of secondary lugs being disposed circumferentially between the lugs of the first primary set of lugs, the lugs of the second set of secondary lugs extending generally axially inwardly from an axial outermost end spaced axially inwardly of the second lateral edge, the lugs of the second set of secondary lugs being disposed circumferentially between the lugs of the second set of primary lugs; and
    a plurality of tread elements, each element having a height measured perpendicularly from a radial outer surface to the inner tread surface that is less than the radial height of a lug as measured perpendicularly at a plane perpendicular to the equatorial plane of the tread from a ground contacting surface of the lug to the inner tread surface, each of the elements being disposed generally axially outwardly of the axially outermost end of a second lug, elements axially outward of lugs of the first set of secondary lugs being circumferentially between lugs of the first set of primary lugs and extending toward the first lateral edge, elements axially outward of lugs of the second set of secondary lugs being circumferentially between lugs of the second set of primary lugs and extending toward the second lateral edge, wherein each tread element is more flexible than the lugs circumferentially adjacent to the tread element to promote a cleaning action.

2. The tread of claim 1 wherein each of the tread elements extends from a secondary lugs to the lateral edge of the tread.

3. The tread of claim 1 wherein each of the tread elements has an axially outer end spaced a predetermined distance from the lateral edge of the tread.

4. The tread of claim 1 wherein each of the tread elements is integral with a secondary lug.

5. The tread of claim 1 wherein each of the tread elements is spaced axially from a secondary lug.

6. The tread of claim 1 wherein the tread element has two radially non parallel axial sidewalls.

7. The tread of claim 1 wherein said tread element has a trapezoidal cross section.

8. The tread of claim 1 wherein said tread element has a rectangular cross section.

9. The tread of claim 1 wherein the tread elements further comprise a first rectangular portion projecting radially outwardly from the inner tread surface and a second portion of a different polygonal shape projecting radially outwardly from the first portion.

10. The tread element of claim 9 wherein the second portion has a trapezoidal cross section.

11. An agricultural tread having an equatorial plane and a net-to-gross ratio in the range of 25 to 40%, the tread comprising:
    a plurality of circumferentially-spaced tread lugs, each lug projecting radially outwardly from an inner tread surface to an outer road contacting tread surface; and
    a plurality of tread elements each of which is disposed axially between one of the lugs and the lateral edge of the tread, each element having a height measured perpendicularly from a radial outer surface to the inner tread surface that is less than the radial height of a lug as measured perpendicularly at the equatorial plane of the tread from a ground contacting surface of the lug to the inner tread surface, each of the tread elements comprising a rectangular portion projecting radially outwardly from the inner tread surface and a second portion of a different polygonal shape projecting radially outwardly from the reactangular portion.

12. The tread element of claim 11 wherein the second portion has a trapezoidal cross section.

* * * * *